Nov. 13, 1923.
A. D. CARTWRIGHT
HORSESHOE
Filed June 14, 1922
1,474,018
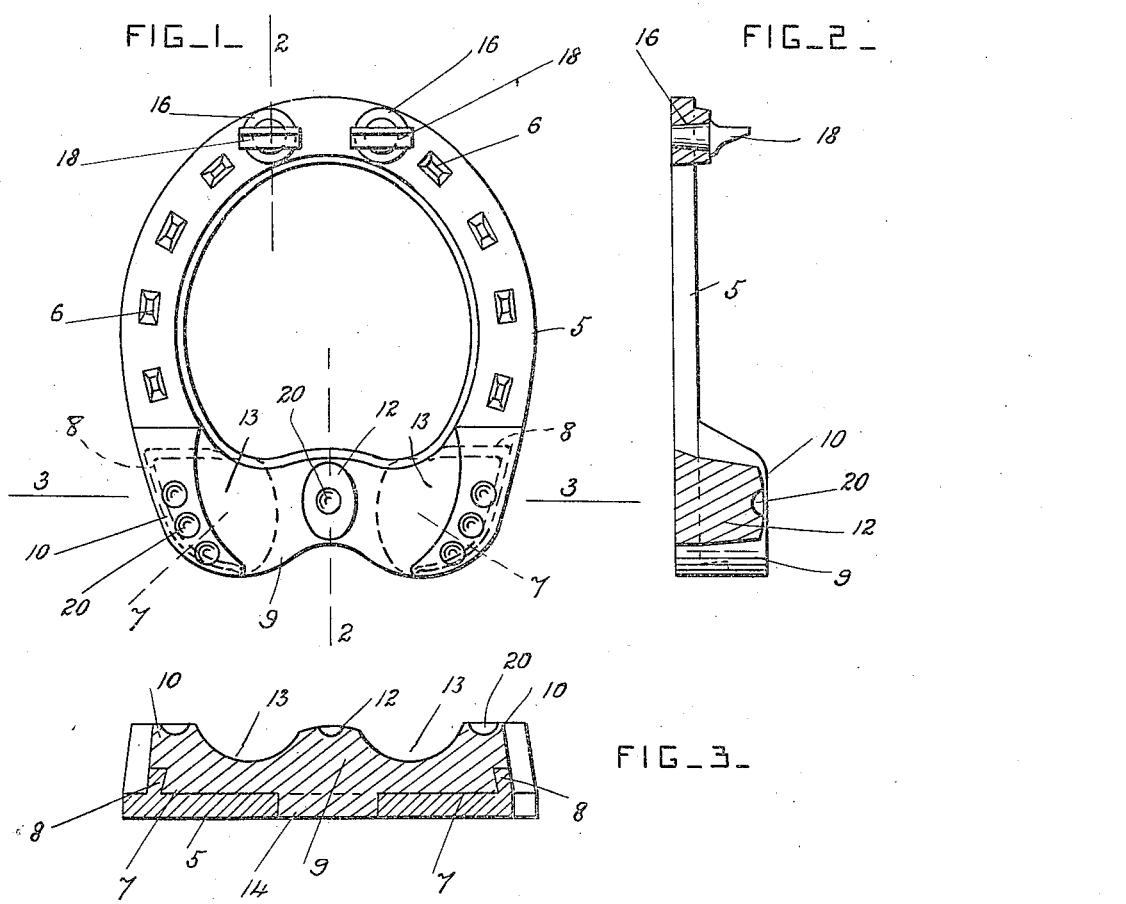
Inventor.
Albert D. Cartwright
by Herbert W. T. Jenner,
Attorney.

Patented Nov. 13, 1923.

1,474,018

UNITED STATES PATENT OFFICE.

ALBERT D. CARTWRIGHT, OF TOLEDO, OHIO, ASSIGNOR OF ONE-HALF TO JAMES G. RAY, OF COLUMBUS, OHIO.

HORSESHOE.

Application filed June 14, 1922. Serial No. 568,323.

*To all whom it may concern:*

Be it known that I, ALBERT D. CARTWRIGHT, a citizen of the United States, residing at Toledo, in the county of Lucas and State of Ohio, have invented certain new and useful Improvements in Horseshoes, of which the following is a specification.

This invention relates to shoes for horses provided with soft treads; and it consists in the novel construction and combination of the parts hereinafter fully described and claimed whereby the shoe is specially adapted to prevent the animal from slipping under ordinary conditions and in summer time, and may also be used on ice in winter time by a slight change which can be made without detaching the shoe from the hoof of the animal.

In the drawings, Figure 1 is a plan view from below of a horseshoe constructed according to this invention; Fig. 2 is a longitudinal section, taken on the line 2—2 in Fig. 1; and Fig. 3 is a cross-section through the bridge-piece, taken on the line 3—3 in Fig. 1.

The shoe 5 is made of any approved form to suit the animal, and it has suitable nail holes 6 in its side portions. The shoe is preferably formed of drop-forged steel, and it has pockets 7 on its heel portions having overhanging outer and front sides 8. These pockets are open at their inner or adjacent portions.

A bridge-piece 9 of india rubber or similar elastic material or composition is vulcanized into the pockets 7 so that it is secured firmly to them and it extends between them.

This bridge-piece has curved wedge-shaped projections 10 on its outer ends which conform to the outline of the pockets and project over the flanges of the pockets so that they are flush with the outer sides of the flanges or pocket sides. The intermediate portion of the bridge-piece between the two pockets has a rounded projection 12 at its middle part which is of substantially the same height as the projections 10.

Longitudinal channels 13 are formed between the concave sides of the curved wedge-shaped projections 10 and the central projection 12, and these channels have concave bottoms and are wider at their front than at their rear ends. This construction prevents the snow from balling under the shoe in winter time, and it does not detract from the utility of the shoe when there is no snow on the ground.

The top 14 of the intermediate portion of the bridge-piece projects upwardly between the pockets, and is arranged flush with the flat upper side of the horseshoe. The blunt ends of the wedge-shaped projections 10 are arranged foremost, and are inclined upwardly and rearwardly.

As shown in Fig. 3, channels are formed longitudinally in the bridge-piece between the outer projections 10 and the center projection 12, so that the heel of the animal is supported upon a row of three cushions or projections of relatively soft material, which effectively prevent the animal from slipping. These projections project below the sides of the pockets so that the metal of the heel portions of the shoe does not touch the ground. The projection 14 at the top of the bridge-piece re-inforces the center projection 12 and prevents it from being flattened unduly.

The projections 10 and 12 serve as calks as well as cushions on ordinary roads and on roads covered with ice or snow.

In order to fit the shoe for use on ice and also on ordinary roads, without removing it from the hoof of the animal, two tapering sockets 16 are preferably provided at the toe portion of the shoe. Calks 18 having tapering shanks are inserted in the sockets, and may be removed and replaced as often as necessary. These calks are blunt for ordinary use, and sharp calks are inserted for use on ice in winter time. Depressions or corrugations 20 are formed in the bottoms of the projections 10 and 12 to prevent slip, and the rounded projection 12 prevents the end portions of the bridge-piece from being twisted out of the pockets as well as preventing the animal from slipping.

What I claim is:

1. A metal horseshoe having on its heel portions pockets provided with overhanging sides, a bridge-piece of relatively soft material secured in the said pockets and extending between them, said bridge-piece having curved wedge-shaped projections on its ends arranged with their blunt ends foremost, and a rounded projection at its middle part separated from the concave sides of the curved projections by longitudinal channels which have concave bottoms and which are wider at their front than at their rear ends, said projections serving as cushions and as calks on ordinary roads and on icy roads.

2. A metal horseshoe having on its heel portions pockets provided with overhanging sides and having sockets for removable calks in its toe portion, a bridge-piece of relatively soft material secured in the said pockets and extending between them, said bridge-piece having curved wedge-shaped projections on its ends arranged with their blunt ends foremost, and a rounded projection at its middle part separated from the concave sides of the curved projections by longitudinal channels which have concave bottoms and which are wider at their front than at their rear ends, said projections serving as cushions and as calks on ordinary roads and on icy roads, and interchangeable metal calks for engaging with the said sockets in the toe portion.

In testimony whereof I have affixed my signature.

ALBERT D. CARTWRIGHT.